United States Patent [19]
Tsuzuki

[11] Patent Number: 5,469,355
[45] Date of Patent: Nov. 21, 1995

[54] NEAR-SYNONYM GENERATING METHOD

[75] Inventor: Kouichi Tsuzuki, Kawasaki, Japan

[73] Assignee: Fujitsu Limited, Kawasaki, Japan

[21] Appl. No.: 115,327

[22] Filed: Sep. 2, 1993

[30] Foreign Application Priority Data

Nov. 24, 1992 [JP] Japan .................................. 4-312531

[51] Int. Cl.⁶ .................................................. G06F 19/00
[52] U.S. Cl. .............................. 364/419.19; 364/419.04; 364/419.14
[58] Field of Search ........................ 364/419.12, 419.13, 364/419.19, 419.11, 419.14, 419.04, 419.08; 395/600

[56] References Cited

U.S. PATENT DOCUMENTS

| | | | |
|---|---|---|---|
| 4,384,329 | 5/1983 | Rosenbaum et al. | 364/419.13 |
| 4,773,039 | 9/1989 | Zamora | 364/419.13 |
| 4,839,853 | 6/1989 | Deerwester et al. | 364/419.13 |
| 5,168,533 | 12/1992 | Kato et al. | 382/54 |
| 5,297,039 | 3/1994 | Kanaegami et al. | 364/419.13 |

FOREIGN PATENT DOCUMENTS 2-129756   5/1990   Japan .
3-015980   1/1991   Japan .

*Primary Examiner*—Gopal C. Ray
*Assistant Examiner*—Xuong M. Chung-Trans
*Attorney, Agent, or Firm*—Staas & Halsey

[57] ABSTRACT

A near-synonym generating method generates near-synonyms of a target character string by retrieving a near-synonym file based on the target character string, where the near-synonym file defines near-synonyms for one or a plurality of words. The near-synonym generating method includes the steps of (a) retrieving the near-synonym file using words which form the target character string as keys, and extracting near-synonyms which are defined for each of the words used as the keys as the near-synonyms for each of the words forming the target character string, (b) forming a near-synonym group from each of the words forming the target character string and the corresponding near-synonyms so as to form a plurality of such near-synonym groups, and selecting the words or near-synonyms from each of the near-synonym groups, and (c) generating the near-synonyms of the target character string by combining the selected words or near-synonyms obtained by the step (b) in an order which is different from the order of the words forming the target character string.

12 Claims, 18 Drawing Sheets

FIG. 5A

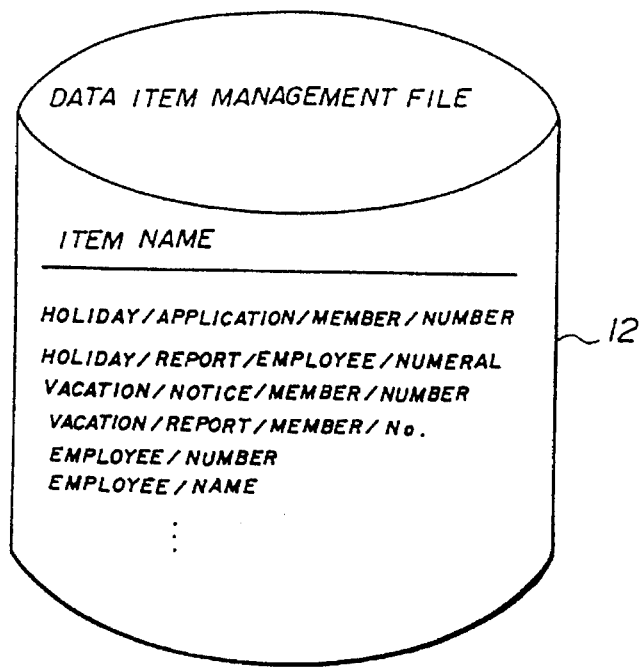

DATA ITEM MANAGEMENT FILE

ITEM NAME

HOLIDAY/APPLICATION/MEMBER/NUMBER
HOLIDAY/REPORT/EMPLOYEE/NUMERAL
VACATION/NOTICE/MEMBER/NUMBER
VACATION/REPORT/MEMBER/No.
EMPLOYEE/NUMBER
EMPLOYEE/NAME
⋮

DIFFERENT SOUNDING SYNONYM
CANDIDATE LIST

/ 14

| ① HOLIDAY/APPLICATION/MEMBER/NUMBER | HOLIDAY/REPORT/EMPLOYEE/NUMERAL<br>VACATION/NOTICE/MEMBER/NUMBER<br>VACATION/REPORT/MEMBER/No.<br>EMPLOYEE/NUMBER<br>MEMBER/HOLIDAY/APPLICATION/NUMBER |
|---|---|
| ② HOLIDAY/REPORT/EMPLOYEE/NUMERAL | HOLIDAY/APPLICATION/MEMBER/NUMBER<br>VACATION/NOTICE/MEMBER/NUMBER<br>VACATION/REPORT/MEMBER/No.<br>EMPLOYEE/NUMBER<br>MEMBER/HOLIDAY/APPLICATION/NUMBER |

FIG. 9A

```
┌─ TARGET CHARACTER STRING ─────────┐
│                                    │
│  U.S./PRESIDENT/CANDIDATE          │──── 1A
│  (Japanese Kanji character for 'rice')│
│                                    │
└────────────────────────────────────┘
```

FIG. 9B

```
                                        ┌─ 8A
┌─ NEAR SYNONYM FILE ──────────────────────────────────────────────┐
│                                                                   │
│  RICE → SASANISHIKI, KOSHIHIKARI                                  │
│                                                                   │
│  AMERICA → U.S., U.S.A., UNITED STATES, STATE OF TEXAS            │
│                                                                   │
│  U.S. PRESIDENT → REAGAN, BUSH                                    │
│                                                                   │
│  CANDIDATE → RECOMMENDED, RECOMMENDATION, SELF-RECOMMENDATION, ELECTION, RUN,│
│              NEXT TERM                                            │
│  PRESIDENTIAL CANDIDATE → BUSH, CLINTON                           │
│                                                                   │
└───────────────────────────────────────────────────────────────────┘
```

FIG. 10

```
                                                    ┌─ 14A'
┌─ RETRIEVAL RESULT ──────────────────────────────────────┐
│                                                          │
│    CANDIDATE○○RECOMMENDED BY PRIME MINSTER MIYAZAWA,    │
│                                                          │
│  APPEALED STIMULATING DEMANDS FOR KOSHIHIKARI, AND       │
│                                                          │
│  VIEWING THE ELECTION OF THE UPPER HOUSE FOR             │
│                                                          │
│  THE NEXT TERM ···                                       │
│                                                          │
└──────────────────────────────────────────────────────────┘
```

FIG. 11

[TARGET CHARACTER]   [RETRIEVAL RESULT]

⎯⎯⎯⎯⎯⎯⎯⎯⎯⎯⎯⎯⎯⎯⎯⎯⎯⎯⎯⎯⎯⎯⎯⎯⎯⎯⎯ 14A

U.S. PRESIDENTIAL CANDIDATE ⇨ ...U.S. PRESIDENTIAL CANDIDATE...

U.S./PRESIDENTIAL CANDIDATE ⇨ PRESIDENT BUSH, REGARDING ELIMINATION OF TRADE BARRIER FOR RICE SUCH AS KOSHIHIKARI AND SASANISHIKI ...
※PRESIDENT BUSH HAS ...

PRESIDENTIAL CANDIDATE/CANDIDATE ⇨ MR. REAGAN OF THE DEMOCRATIC PARTY WAS ELECTED...
EX PRESIDENT REAGAN VISITED OO AND RECOMMENDED MR. XX
PRESIDENT BUSH IS EXPECTED TO RUN FOR THE NEXT PRESIDENTIAL ELECTION

AMERICA'S PRESIDENTIAL CANDIDATE ⇨ AMERICA'S PRESIDENTIAL CANDIDATE

AMERICA/PRESIDENTIAL CANDIDATE ⇨ ... U.S. PRESIDENTIAL CANDIDATE HAS ...
CANDIDATE CLINTON VISITED STATE OF TEXAS AND ....
THIS EVENING AT THE WHITE HOUSE IN U.S.A., PRESIDENT BUSH ...

FIG. 12A

TARGET CHARACTER STRING

SEASONINGS / SET — 1B

FIG. 12B

NEAR SYNONYM FILE — 8B

SEASONING → SALAD OIL / FLOUR / DRIED BONITO / SOY SAUCE

SET → COMBINATION / PACKAGE / GIFT / PACKED / BAG

FIG. 12C

RETRIEVAL OF SIMILAR GOODS

COMBINATION OF SEASONINGS

SET OF SALAD OILS — 9B

GIFT PACKAGE OF FLOURS

PACKAGE OF DRIED BONITTO

COMBINATION OF SOY SAUCES

FIG. 14A

TAGET CHARACTER STRING

| YY COMPANY/C BUILDING | ~1C

FIG. 14B

DESTINATION INFORMATION DEFINITION FILE

```
YY COMPANY → YY COMPANY LIMITED
1 MIN. WALK FROM STATION A → 1 ST. BRANCH
OPPOSITE B BUILDING → 2ND BRANCH
NEXT TO B BUILDING → 3RD BRANCH
NEAR B BUILDING → 2ND/3RD BRANCH
5TH FLOOR OF C BUILDING → 3RD BRANCH
C BUILDING → 3RD BRANCH
NEAR SCHOOL D → 4TH BRANCH
```
~8C

FIG. 14C

GENERATED RESULT

| YY COMPANY LIMITED 3RD BRANCH | ~9C

FIG. 14D

BUILDING MANAGEMENT DATABASE  12C

| YY COMPANY LIMITED 3RD BRANCH | A CITY C AVENUE 1-1-1<br><br>NEXT TO B BUILDING<br><br>5TH FLOOR OF C BUILDING<br><br>5 MIN. WALK FROM STATION | TEL. NO. |
|---|---|---|

FIG. 16A

TARGET CHARACTER STRING

| DATA COMMUNICATION | ~ 1D

FIG. 16B

SIMILAR DOCUMENT DEFINITION FILE  8D

DATA → PERSONAL COMPUTER, ANALOG, COMMAND, AUDIO, ···

COMMUNICATION → TRANSMIT, NETWORK, PROTOCOL, MAIL ···

FIG. 16C

DOCUMENT LIST  14D

QUESTIONS & ANSWERS TO DATA TRANSMISSION
INTRODUCTION TO TELEPHONES
DATA COMMUNICATION HANDBOOK
DIGITAL SWITCHING
DATA SWITCHING NETWORK CATALOG
DATA COMMUNICATION PROTOCOL
RS-232C COMMUNICATION HANDBOOK
OSI
MULTI-HYPER
AT COMMANDS & APPLICATIONS
INFOMATION COMMUNICATION PROTOCOL
ACCOUNTING SYSTEM OF VAN
AUDIO MAIL SERVICE
COMPUTER COMMUNICATION
DATA COMMUNICATION TECHNIQUE SEMINAR

FIG. 17A

TARGET CHARACTER STRING

| JU GYOU IN BANGOU | ~ IE |

FIG. 17B

NEAR SYNONYM DEFINITION TABLE

| → / |
| → / / No. | ~ 8E |

FIG. 17C

GENERATED RESULT

[ empty box ] ~ 9E

FIG. 18A

TARGET CHARACTER STRING

| Atsugi-Shi glass repair | ~ 1F

FIG. 18B

NEAR-SYNONYM DEFITION FILE  ~ 8F

Atsugi-Shi → Atsugi
  Glass → stained glass, pane, window frame, window
  Repair → work, industry, factory, material, shop

FIG. 18C

LIST OF RETRIEVED SHOP NAMES  ~ 14F

|  | (TEL. NO.) | (ADDRESS) |
|---|---|---|
| ATSUGI GLASS | XX-XXXX | ○○AVENUE 1-1-1 |
| ATSUGI STAINED GLASS STUDIO | XX-XXXX | △△△870-5 |
| ATSUGI WINDOW FRAME INC. | XX-XXXX | □□□213 |
| ATSUGI △△GLASS | XX-XXXX | XX 2-16 |
| △△GLASS SHOP | XX-XXXX | ○2-16 |
| △△△PANE SHOP | XX-XXXX | △△△2-2-2 |
| △△ PANE MATERIALS | XX-XXXX | ○6-11 |
| △△PANE SHOP(LTD.) | XX-XXXX | △2-2 |
| WINDOW FRAME INDUSTRIES △△△ | XX-XXXX | X1234 |
| △△SPECIAL GLASS INDUSTRIES (A) | XX-XXXX | ○○○3-3 |
| △△SPECIAL GLASS INDUSTRIES (B) | XX-XXXX | XXX4-4 |

FIG.19

| | | | | |
|---|---|---|---|---|
| GLASS PRINTING | GLASS WARES PRODUCTION/WHOLESALE | GLASS FIBER /PRODUCTION | | |
| GLASS CASE | GLASS WARES SHOP | | GLASS SHOP | GLASS CONTAINER PRODUCTION /WHOLESALE |
| GLASS ARTS | GLASS PRODUCTION/WHOLESALE | | | |
| STAINED GLASS | GLASS FIBER REINFORCED PLASTIC | | | |
| GLASS CONSTRUCTION | | | | |

NEAR-SYNONYM GENERATING METHOD

BACKGROUND OF THE INVENTION

The present invention generally relates to near-synonym generating methods, and more particularly to a near-synonym generating method which divides a character string which is to be retrieved into words and generates near-synonyms of the character string by combining near-synonyms which are extracted for each of the words.

The generation of near-synonyms is essential when retrieving various electronic documents with a high accuracy. The "near-synonym" is sometimes also referred to as a "quasi-synonym". The near-synonym of a certain word refers to a word which has the same or similar meaning as the certain word. The generation of near-synonyms is particularly effective when matters related to a certain theme are to be retrieved from a large scale database without omission.

An example of a conventional document retrieval using near-synonyms will be described with reference to FIG. 1. In FIG. 1, it is assumed for the sake of convenience that a character String which is to be retrieved (hereinafter simply referred to as a "target character string") is "holiday/application/member/number". A predetermined electronic document is retrieved using this target character string, and near-synonyms of the target character string within the electronic document are extracted. In the electronic document, a plurality of near-synonyms are included in the target character string as shown in FIG. 1.

In this case, the near-synonyms which are extracted as a result of the retrieval were conventionally the same character string as the target character string and the character String "holiday application member number" having a head which matches that of the target character string.

There is also another known document retrieval method which carries out the retrieval as follows. That is, the target character string "holiday application member number" is divided into words "holiday", "application", "member" and "number" which form this target character string, and the near-synonyms are extracted for each of these words. For example, near-synonyms "report", "employee" and "numeral" are respectively extracted as the near-synonyms of the words "application", "member" and "number". Such near-synonyms are defined in advance for each word. The electronic document is retrieved using a character string "holiday report employee numeral" which is obtained by combining the extracted near-synonyms, and a character string which is the same as this character string is extracted as the target character string of the near-synonyms.

Each element forming the target character string is called a "word", and a character string which is made up of a plurality of words is called a "compound word".

According to the conventional document retrieval methods described above, a character string which is the same as the target character string and a character string having a head which matches that of the target character string were extractable as near-synonyms.

However, there was a problem in that it was impossible to extract a character string having a head (or a part of the head) which does not match that of the target character string, a character string (different sounding synonyms) having completely different words and phrases (sounds) from those of the target character string but having the same meaning as the target character string and the like. For example, in the example shown in FIG. 1, it was impossible to extract "vacation notice member number" and "vacation report member No.".

On the other hand, according to the conventional document retrieval method which uses a combination of the near-synonyms that are extracted for each of the words obtained by dividing the target character string, the extraction was satisfactory to a certain extent depending on the definition of the near-synonyms for each of the words.

However, there was a problem in that it was impossible to extract a character string in which the words and a part of their near-synonyms of the target character string are missing, a character string which is added with one or more words unrelated to the target character string, a character string having the words or near-synonyms arranged in a different order from that of the target character string and the like. For example, in the example shown in FIG. 1, it was impossible to extract "employee number" which is missing a part corresponding to "holiday" and "application", and "member holiday application number" in which a part corresponding to "holiday", "application" and "member" is ordered differently from the target character string.

In addition, according to the conventional document retrieval method which uses the combination of the near-synonyms of the words, there was a problem in that the operator must manually insert in the target character String an end symbol (character) "/" at the end of each word when the target character string is divided into the words. In other words, the operator must have a knowledge related to the words and the near-synonyms. In addition, if the target character string is long and contains a large number of words or, a large number of target character strings need to be input, the process of inserting the end symbol is troublesome and a big burden on the operator.

Therefore, the conventional document retrieval method realized a satisfactory document retrieval only to a certain extent, and the result of the extraction often omitted the necessary near-synonyms, as may be seen from the examples given above. For this reason, a highly accurate document retrieval could not be achieved by the conventional document retrieval methods. In other words, the conventional generation of the near-synonyms was unsuited or insufficient for the purposes of carrying out a retrieval with a high accuracy.

SUMMARY OF THE INVENTION

Accordingly, it is a general object of the present invention to provide a novel and useful near-synonym generating method in which the problems described above are eliminated.

Another and more specific object of the present invention is to provide a near-synonym generating method for generating near-synonyms of a target character string by retrieving a near-synonym file based on the target character string, where the near-synonym file defines near-synonyms for one or a plurality of words and the near-synonym generating method comprises the steps of (a) retrieving the near-synonym file using words which form the target character string as keys, and extracting near-synonyms which are defined for each of the words used as the keys as the near-synonyms for each of the words forming the target character string, (b) forming a near-synonym group from each of the words forming the target character string and the corresponding near-synonyms so as to form a plurality of such near-synonym groups, and selecting the words or near-synonyms from each of the near-synonym groups, and (c) generating the near-synonyms of the target character string by combining the selected words or near-synonyms obtained by the step (b) in an order which is different from the order of the words forming the target character string. According to the near-synonym generating method of the present invention, it is possible to generate the near-synonyms of the target character string which is suited for retrieving the character string with a high accuracy.

Other objects and further features of the present invention will be apparent from the following detailed description when read in conjunction with the accompanying drawings.

BRIEF DESCRIPTION OF THE DRAWINGS

FIG. 5 in parts (A) and (B) is a diagram for explaining the operation of the embodiment;

FIG. 9 in parts (A) and (B) is a diagram for explaining an application of the embodiment;

FIG. 10 is a diagram for explaining a reference example;

FIG. 11 is a diagram for explaining an application of the embodiment;

FIG. 12 in parts (A), (B) and (C) is a diagram for explaining an application of the embodiment;

FIG. 14 in parts (A), (B), (C) and (D) is a diagram for explaining an application of the embodiment;

FIG. 16 in parts (A), (B) and (C) is a diagram for explaining an application of the embodiment;

FIG. 17 in parts (A), (B) and (C) is a diagram for explaining an application of the embodiment;

FIG. 18 in parts (A), (B) and (C) is a diagram for explaining an application of the embodiment; and FIG. 19 is a diagram for explaining the application of the embodiment of FIG. 18.

DESCRIPTION OF THE PREFERRED EMBODIMENTS

Figure 1:
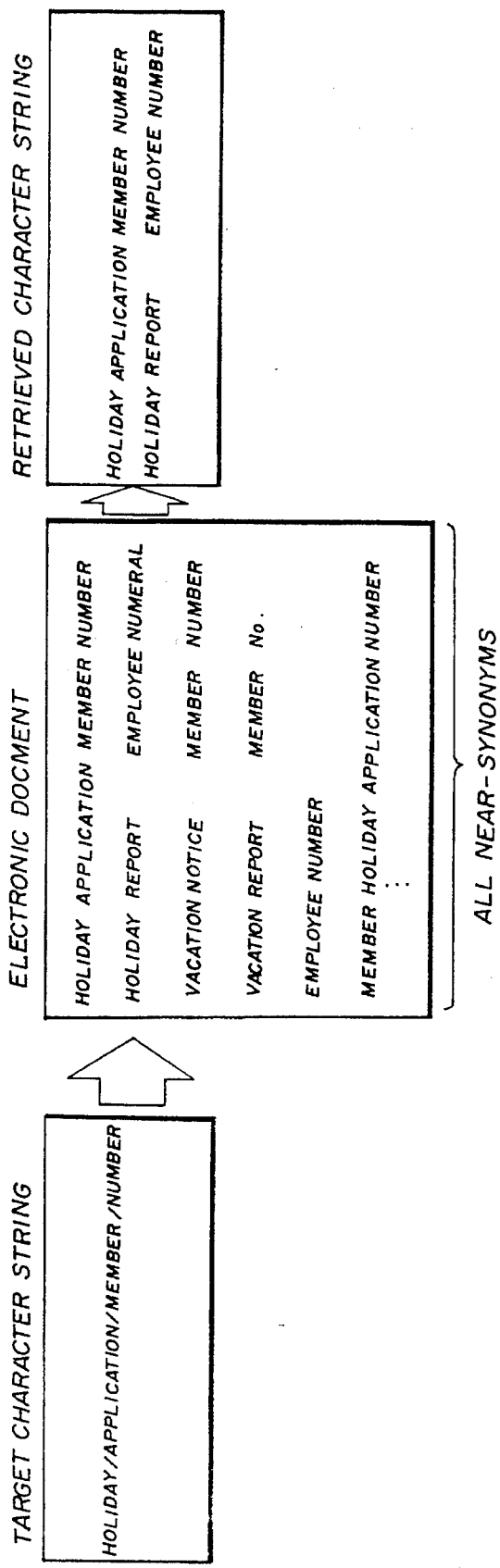
FIG. 1 is a diagram for explaining an example of a conventional document retrieval method using near-synonyms.

First, a description will be given of the operating principle of the present invention, by referring to FIG. 2.

A near-synonym generating process of a near-synonym generator 2 is a process of generating near-synonyms of a target character string 1 by retrieving a near-synonym file 8 based on the target character string 1 which is input by the operator. The near-synonym file 8 defines near-synonyms for one or a plurality of words.

In the near-synonym generating process, the near-synonym file 8 is retrieved using the words forming the target character string 1 as keys, and near-synonyms which are defined for each of the words used as the keys are extracted as the near-synonyms for each of the words forming the target character string 1. In addition, a group (near-synonym group) is formed from each of the words forming the target character string 1 and the corresponding near-synonyms, and thus, a plurality of such near-synonym groups are formed. The words or near-synonyms are selected from each of the near-synonym groups.

A replacing near-synonym processor 5 generates the near-synonyms of the target character string 1 by combining the selected words or near-synonyms in an order which is different from the order of the words forming the target character string 1.

A missing near-synonym processor 6 generates the near-synonyms of the target character string 1 by using two or more selected words or near-synonyms.

An adding near-synonym processor 7 generates the near-synonyms of the target character string 1 by using two or more selected words or near-synonyms and other words unrelated to the target character string 1 based on a predetermined rule. The near-synonym file 8 which is used for the above retrieval also defines different sounding synonyms of the words as the near-synonyms of the words, and hierarchically defines the relationship of the words and the near-synonyms. As described above, the different sounding synonyms are words which sound differently, that is, have completely different pronunciations, but have the same meaning.

A retrieval processor 4 which carries out the near-synonym generating process includes the replacing near-synonym processor 5, the missing near-synonym processor 6 and the adding near-synonym processor 7 described above. The near-synonyms generated from the retrieval processor 4 are output as a generated result 9.

Prior to the retrieval described above, a character string divider 3 divides the target character string 1 into the words forming the target character string 1, if the target character string 1 is not yet divided into such words. The target character string 1 is divided into the words by using the words the near-synonyms of which are defined in the near-synonym file 8.

Figure 3:
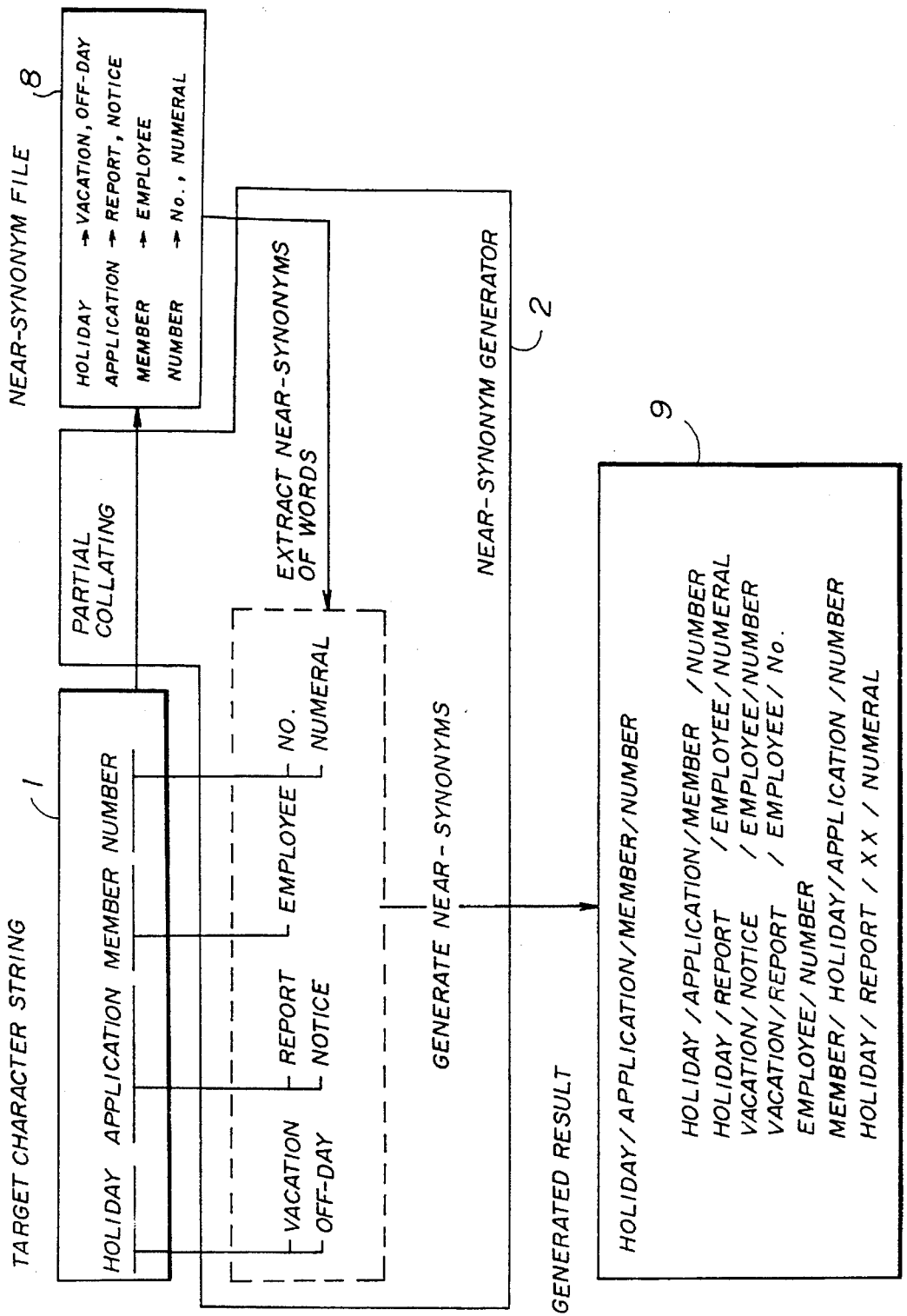
FIG. 3 is a diagram for explaining the functions of the present invention.

FIG. 3 is a diagram for explaining the functions of the present invention. It will be assumed for the sake of convenience that the present invention is applied to the case shown in FIG. 1.

The near-synonym file 8 defines the near-synonyms of one or a plurality of words. For example, the near-synonym file 8 defines the near-synonyms "vacation" and "off-day" for the word "holiday", and the different sounding synonym "No." as the near-synonym of the word "number". In addition, the near-synonym file 8 hierarchically defines the relationship of the word "number" and its near-synonym "No.". In other words, the near-synonym file 8 makes the definitions so that "No." in the lower hierarchy can be retrieved as the near-synonym from "number" in the higher hierarchy, but "number" in the higher hierarchy cannot be retrieved as the near-synonym from "No." in the lower hierarchy.

A character string "holiday application member number" is input as the target character string 1, but this character string is not divided into words such as "holiday" forming the target character string 1. Hence, the character string divider 3 first divides the target character string 1 into the words "holiday", "application", "member" and "number" which form the target character string 1, by using the words such as "holiday" for which the near-synonyms such as "vacation" are defined in the near-synonym file 8 as their near-synonyms.

Hence, it is possible to eliminate the need for the operator to manually insert the end symbols "/" at the end of each word forming the target character string 1. As a result, it is possible to considerably reduce the burden on the operator. Furthermore, the operator does not need to have the knowledge related to the generation of the near-synonyms.

The retrieval processor 4 retrieves the near-synonym file 8 for each of the words such as "holiday" forming the target character string 1 which is divided by the character string divider 3 (or by the operator), and extracts the near-synonyms such as "vacation" and "off-day". The near-synonyms of the target character string 1 are generated by combining such extracted near-synonyms.

Since the near-synonym file 8 also defines the different sounding synonym "No." as the near-synonym of the word "number", a near-synonym "vacation report member No." is generated using the defined near-synonyms. In other words, the different sounding synonyms of the target character string 1 can be generated as the near-synonyms of the target character string 1.

The retrieval processor 4 forms the word "holiday" and its near-synonyms "vacation" and "offday" into one group, and similarly forms four groups. In addition, one word or near-synonym is selected from each group.

For example, it is assumed for the sake of convenience that "holiday", "application", "member" and "number" are selected. In this case, the replacing near-synonym processor 5 replaces the order of these selected words, and for example generates "member holiday application number" as the replaced near-synonym of the target character string 1.

Accordingly, it is possible to generate as the near-synonyms of the target character string 1 a character string which has a head different from that of the target character string 1, a character string in which the order of the words (or their near-synonyms) are different from that of the target character string 1 and the like.

In addition, if "holiday", "application", "employee" and "number" are selected, for example, the missing near-synonym processor 6 two or more (or three or less) words out of these selected words to generate "employee number", for example, as the near-synonym of the target character string 1.

As a result, it is possible to generate as the near-synonym of the target character string 1 a character string in which the words or a part of the target character string 1 are missing.

On the other hand, if "holiday", "report", "employee" and "numeral" are selected, for example, the adding near-synonym processor 7 uses two or more words out of these selected words and another unrelated word "XX" to generate "holiday report XX numeral", for example, as the near-synonym of the target character string 1.

As a result, it is possible to generate as the near-synonym of the target character string 1 a character string in which one or more words unrelated to the target character string 1 are added.

Therefore, according to the present invention, plenty of near-synonyms of the target character string 1 can be generated within a predetermined relationship range from the target character string 1.

Figure 4:
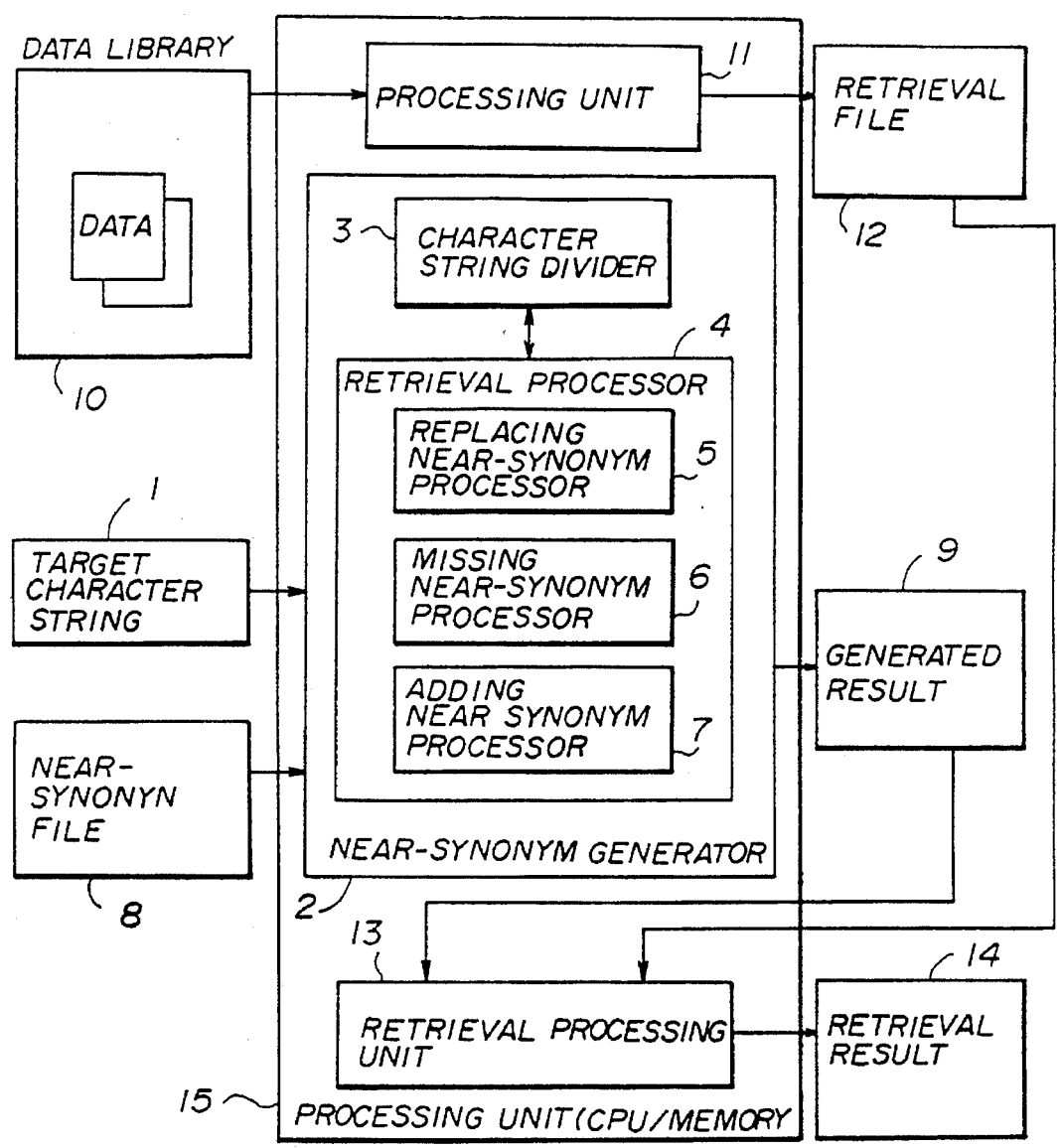
FIG. 4 is a system block diagram showing a data processing unit applied with an embodiment of a near-synonym generating method according to the present invention.
Figure 6A:
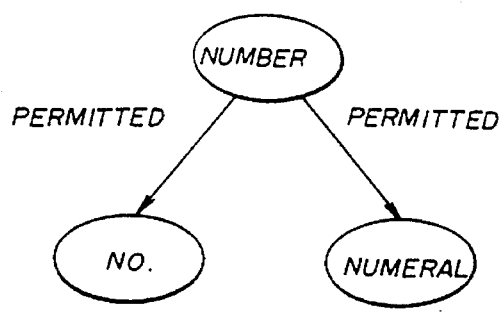
FIG. 6 in parts (A), (B), (C) and (D) is a diagram for explaining a hierarchical structure of a near-synonym file.
Figure 6B:
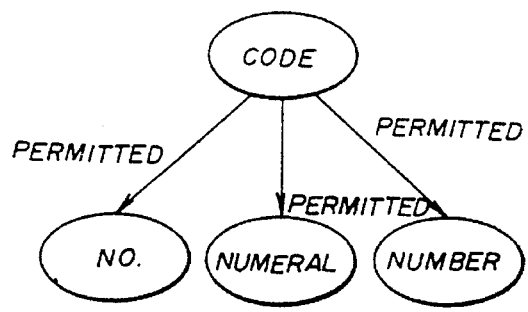
Figure 6C:
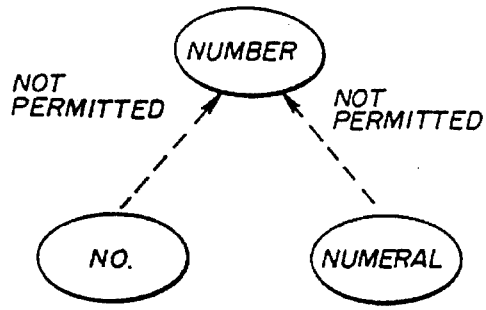
Figure 6D:
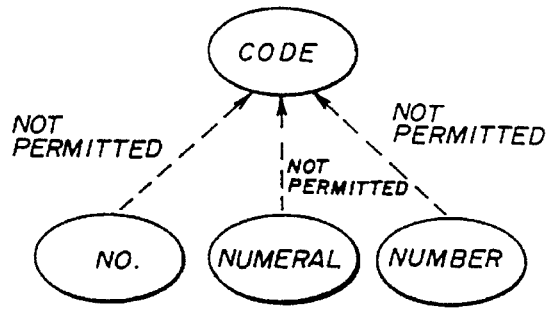

Next, a description will be given of an embodiment of a near-synonym generating method according to the present invention. FIG. 4 shows a data processing unit applied with this embodiment.

In this embodiment, near-synonyms are generated with respect to items (names) of a text in order to arrange a COBOL copy text (corresponding to a data library 10). The generated near-synonyms are used to retrieve a list of the items so as to detect similar item names.

More particularly, during a program developing process, the post (member) that is carrying out the development using the COBOL language has in possession a large number of COBOL copy texts. Each item of the COBOL copy text has a unique meaning within one member, but has different meanings among a plurality of members. In other words, the same item name may mean different things (homonym), and different item names may mean the same thing (different sounding synonyms). Hence, a large number of such homonyms and different sounding synonyms exist among a plurality of members. When arranging such items, the near-synonym generating method according to the present invention is used to retrieve the different sounding synonyms with a high accuracy.

In this embodiment, the data library 10 is made up of a copy library including a large number of COBOL copy texts. The COBOL copy text corresponds to the data portion of the program.

The items of the COBOL copy text correspond to the data of the data library 10, and are subject of the retrieval using the near-synonyms. In the COBOL language, only the use of alphanumerics is permitted, and Japanese kana and/or kanji characters cannot be used. In other words, the items which are the subject of the retrieval are all written in alphabets, that is, English. For example, the word "holiday application member number" is written in alphabets and used as a text name.

On the other hand, the target character string 1 in this embodiment is input in Japanese kana and/or kanji characters, that is, "holiday application member number" is input in Japanese. Accordingly, it is impossible to make the retrieval of the near-synonyms in this state, and for this reason, a retrieval file 12 is formed.

FIG. 5 (A) shows the retrieval file 12. The retrieval file 12 stores all items (item names) used in the data library 10 which is made up of the COBOL text copy library in the Japanese kana and/or kanji characters. However, for the sake of convenience, the items (item names) stored in the retrieval file 12 are shown in English in FIG. 5 (A). For example, an item name "holiday application member number" is written in the Japanese kanji characters and stored in the data library 10. This retrieval file 12 is the direct subject of the retrieval using the near-synonyms.

The retrieval file 12 is formed by a processing unit 11. In this embodiment, the processing unit 11 includes a tool which is provided by the COBOL language system, and defines the item names in alphabets (English) and the corresponding expressions in the Japanese kana and/or kanji characters. This definition is input in advance by the system manager or the operator who makes the near-synonym retrieval. Based on this definition, the processing unit 11 forms the retrieval file 12 by generating the item names expressed in the Japanese kana and/or kanji characters from the item names expressed in alphabets (English).

The retrieval file 12 is used for various purposes as a data item management file of the system, because the item names expressed in the Japanese kana and/or kanji characters are mope convenient for management purposes in the case where the native language of the operator is Japanese. In actual practice, a data item management file which is already formed by the above tool is used as the retrieval file 12.

If the code used by the data library 10 and subject to the retrieval, and the code of the target character string 1 employ the same coding system, such as the case where the target character string 1 is input in alphabets, there is no need to newly form the retrieval file 12. For example, the data items (or a list of the data items) in the data library 10 can be retrieved based on the target character string 1.

The target character string 1 is input by the operator from an input device (not shown) which is coupled to a processing unit 15 which has a known construction including a central processing unit (CPU) and a memory. The target character string 1 is made up of words or compound words. If the target character string 1 is made up of compound words, each of the words do not need to be divided using the end symbol "/".

The operator does not need to know whether or not a word identical to the target character string 1 which is input by this operator exists in the retrieval file 12 (or the data library 10 which is the source). In other words, the operator simply needs to input a character string similar to the item names to be arranged. The item names to be arranged are generated as the near-synonyms.

In this embodiment, the near-synonym file 8 has a structure identical to that shown in FIG. 3 described above. That is, the near-synonym file 8 is written in the Japanese kana and/or kanji characters, and defines the near-synonyms of a certain word including the different sounding synonyms of this certain word. Examples of the different sounding synonyms are "notice" for the word "application", and "No." for the word "number". Such definitions are made in advance by the operator prior to the generation of the near-synonyms.

Figure 2:
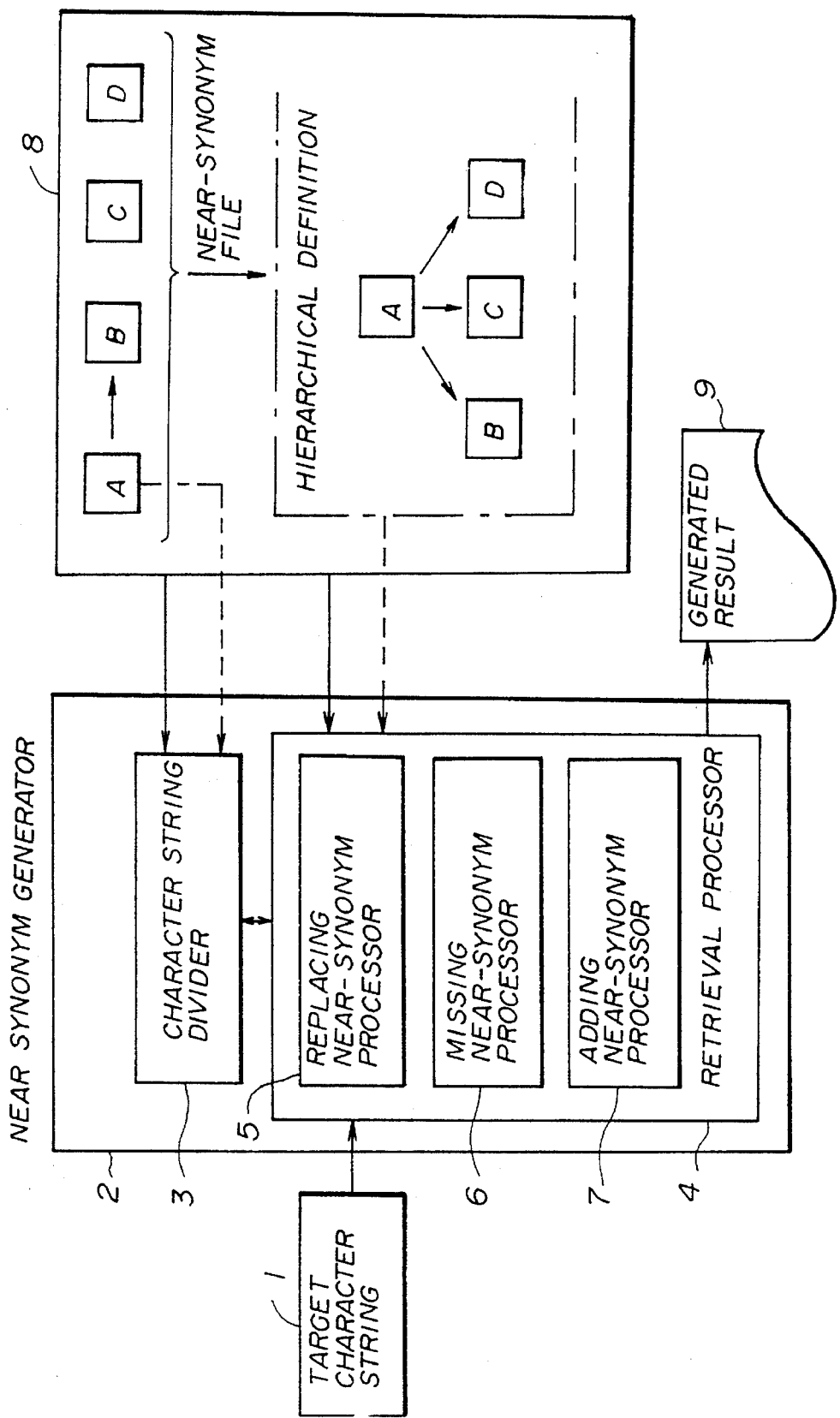
FIG. 2 is a diagram for explaining the operating principle of the present invention.

As shown in FIG. 2 described above, the near-synonym file 8 hierarchically defines the relationships of the word A and the near-synonyms B, C and D. This hierarchical definition in more detail is shown in FIG. 6.

The hierarchical definition is made as shown in FIG. 6 with respect to four words "number", "No.", "numeral" and "code" which have relatively similar meanings. In other words, the word in the lower hierarchy is recognized as a near-synonym of the word in the higher hierarchy, but the word in the higher hierarchy is not recognized as a near-synonym of the word in the lower hierarchy.

More particularly, "No." and "numeral" are defined and extracted as near-synonyms of "number", as shown in FIG. 6 (A). However, "number" and "No." are not defined as near-synonyms of "numeral" and cannot be extracted, as shown in FIG. 6 (C). In addition, "number" can be extracted as a near-synonym of "code" as shown in FIG. 6 (B), but "code" cannot be extracted as a near-synonym of "number" as shown in FIG. 6 (D).

Words such as "number" which is ordinarily used and "code" which is generally used in data processing are defined as words belonging to the higher hierarchy. On the other hand, words such as "NO." and "numeral" which are less frequently used are defined as words belonging to the lower hierarchy.

As described above, the processing unit 15 is made up of the CPU and the memory. The near-synonym generator 2, the processing unit 11 and a retrieval processing unit 13 are realized by programs stored in the memory and executed by the CPU of the processing unit 15. On the other hand, the data library 10, the retrieval file 12, the near-synonym file 8, the generated result 9 of the near-synonym generating process, and a retrieval result 14 of the retrieval process are stored in an external storage (not shown) such as a magnetic disk. The generated result 9 and the retrieval result 14 are output by a predetermined output device (not shown) such as a display and a printer.

The near-synonym generating processor 2 includes the character string divider 3 and the retrieval processor 4.

The character string divider 3 refers to the near-synonym file 8 and divides the target character string 1 by using the words in the higher hierarchy such as "holiday" for which the near-synonyms are defined. For example, "holiday application member number" is divided into four words "holiday", "application", "member" and "number".

The near-synonym generating processor 2 or the character string divider 3 judges whether or not the target character string 1 is divided, that is, whether or not the end symbol "/" exists. The division of the target character string 1 takes place if not divided, and the division is made according to the end symbol "/" if divided.

The retrieval processor 4 includes the replacing near-synonym processor 5, the missing near-synonym processor 6, and the adding near-synonym processor 7.

In the retrieval processor 4, the near-synonym file 8 is retrieved using the words forming the target character string 1 as keys, and near-synonyms which are defined for each of the words used as the keys are extracted as the near-synonyms for each of the words forming the target character string 1. In addition, a group (near-synonym group) is formed from each of the words forming the target character string 1 and the corresponding near-synonyms, and thus, a plurality of such near-synonym groups are formed. The words or near-synonyms are selected from each of the near-synonym groups.

Thereafter, the retrieval processor 4 combines the selected words or near-synonyms to generate the near-synonym of the target character string 1. In this case, the order with which the words or the like are combined is made the same as the order in which the words forming the target character string 1 are arranged. In other words, the words "holiday", "application", "member" and "number" shown in FIG. 3 which are selected from the group are arranged in this order. As a result, "holiday report employee numeral" and the like are generated.

On the other hand, the replacing near-synonym processor 5 generates the replaced near-synonyms of the target character string 1 by combining the selected words or near-synonyms from each group in an order which is different from the order of the words forming the target character string 1. As a result, the replaced (or rearranged) near-synonyms such as "member holiday application number" are generated. The number of words forming the replaced near-synonym which is generated in this manner is equal to the number of words forming the original target character string 1.

The missing near-synonym processor 6 generates the near-synonyms of the target character string 1 by using two or more selected words or near-synonyms from each group. As a result, the missing near-synonyms such as "employee number" are generated.

A number k of the words and the like used to generate the near-synonym satisfies a relation $2 \leq k \leq (n-1)$, where n denotes the number of words forming the target character string 1. The number k is set to 2 or greater because an extremely large number of near-synonyms will be generated if k=1, and the accuracy of the retrieval consequently becomes poor if k=1. The retrieval processor 4 carries out the processing for the case where k=n.

The number k may be 3 or greater, and may be changed depending on the number of near-synonyms to be generated. In addition, the near-synonyms can once be generated by setting the number k to 2 or greater, and if the number of generated near-synonyms is too large, it is possible to output as the generated result 9 only those near-synonyms generated for k+1. The number of words and the like forming the near-synonym which is generated in such a manner is smaller than the number of words forming the original target character string 1.

The adding near-synonym processor 7 generates the near-synonyms of the target character string 1 by using two or more selected words and the like from each group and other words unrelated to the target character string 1 based on a predetermined rule. The unrelated word will be represented by "XX". As a result, an added near-synonym "holiday report XX numeral" and the like are generated. Two or more selected words or near-synonyms from each group are used in this case for the same reasons described above for the process of the missing near-synonym processor 6. Accordingly, three or more words or near-synonyms may be selected from each group.

Typical examples of the unrelated word "XX" are general names such as "Smith", "Jones", "U.S.A.", "Company Limited", "Illinois" and "Chicago". Such unrelated words are effective when retrieving the company name and the like.

The adding near-synonym processor 7 carries out the process according to the predetermined rule which is prescribed by the distance. For the sake of convenience, it will be assumed that the number of words forming the target character string 1 is n, and the distance between two mutually adjacent words is "1". In this case, a value n which is identical to the number of words forming the target character string 1 is set as the maximum distance, and the near-synonyms of the target character string 1 are generated at a distance less than or equal to this maximum distance.

Accordingly, the number of words forming the added near-synonym which is generated is n+1 which is "1" greater than the number of words n forming the target character string 1. In this state, the distance between two end words of the near-synonym (that is, the maximum distance in this character string) is equal to the number of words n forming the target character string 1.

The maximum distance is set to n because an extremely large number of near-synonyms would be generated if the maximum distance were set to n+1. If such extremely large number of near-synonyms are generated, it may be regarded that the accuracy of the retrieval will become poor.

If the maximum distance is n or less, the maximum distance may be n−1, and the added near-synonyms are generated within a range determined by "n or less". If the number of near-synonyms which are generated is small, the maximum distance may be set to n+1.

On the other hand, if the two unrelated words "XX" appear in succession, these unrelated words are treated as one word. By taking this measure, it is possible to improve the degree of freedom with which the near-synonyms are generated, while conforming to the predetermined rule. Therefore, it is possible to generate the near-synonyms without omission and improve the accuracy of the retrieval.

The near-synonyms which are generated by the retrieval processor 4 including the processors 5, 6 and 7 are output from the near-synonym generator 2 as the generated result 9. The generated result 9 of this embodiment is the same as that shown in FIG. 3.

The processes of the retrieval processor 4 including the processors 5, 6 and 7 are not carried out independently but are carried out as a series of processes. For example, the retrieval processor 4 selects one word from each near-synonym group described above, and one near-synonym is generated by arranging the selected words in order. Next, the order of the words of the near-synonym is replaced or changed to generate a plurality of replaced near-synonyms. Furthermore, the missing near-synonym is generated for all of the near-synonyms which are generated in the above described manner by omitting a part of the near-synonyms. The added near-synonyms are generated by adding the unrelated word "XX" with respect to all of the near-synonyms which are generated in the above described manner. Therefore, the near-synonyms are generated without omission by relatively simple processes.

The retrieval processing unit 13 extracts the near-synonyms by retrieving the retrieval file 12 using the near-synonyms indicated on the generated result 9, and outputs the extracted near-synonyms as the retrieval result 14.

The retrieval result 14 of this embodiment is shown in FIG. 5 (B). This retrieval result 14 is used as a list of different sounding synonyms for the item names of the COBOL copy text. In this case, the operator inputs "holiday application member number" and "holiday report employee numeral" as the target character strings 1, and obtains the near-synonyms for each of these target character strings 1.

The retrieval processing unit 13 forms and outputs the retrieval result 14 in the form of a list having a predetermined format so as to facilitate viewing by the operator. In addition, when displaying this list, each of the near-synonyms are arranged in order from the top starting from the near-synonym closest to the target character string 1. The distance from the arranged order of the words forming the original target character string 1 is used to judge the closeness of each near-synonym from the target character string 1. As shown in FIG. 5 (B), the words which are not subjected to the replacement described above and are not missing a word or are added with a word are arranged at the top, and those words subjected to the replacement are arranged below starting from the word subjected to the smallest degree of replacement.

Figure 7:
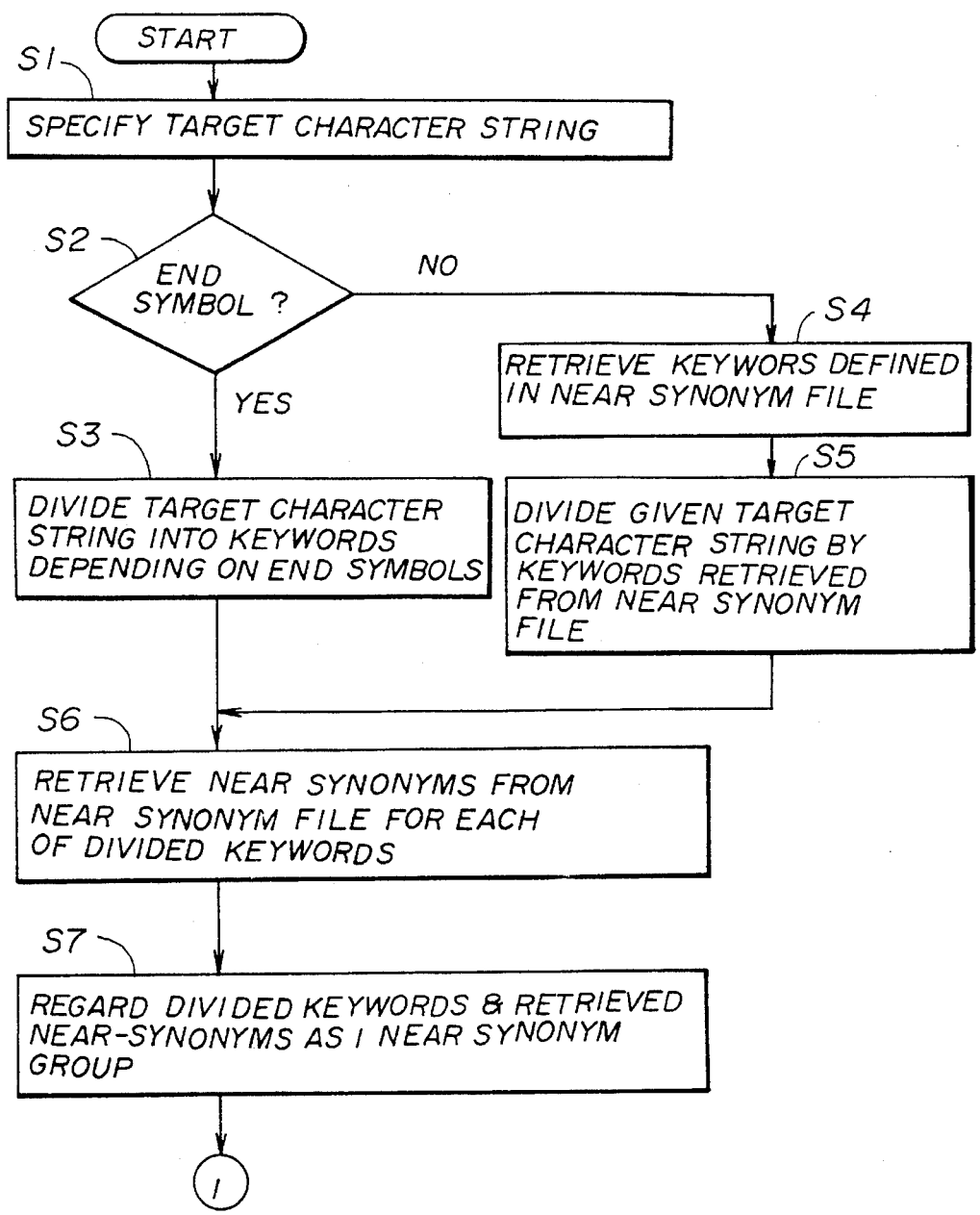
FIG. 7 is a flow chart for explaining a near-synonym generating process.
Figure 8:
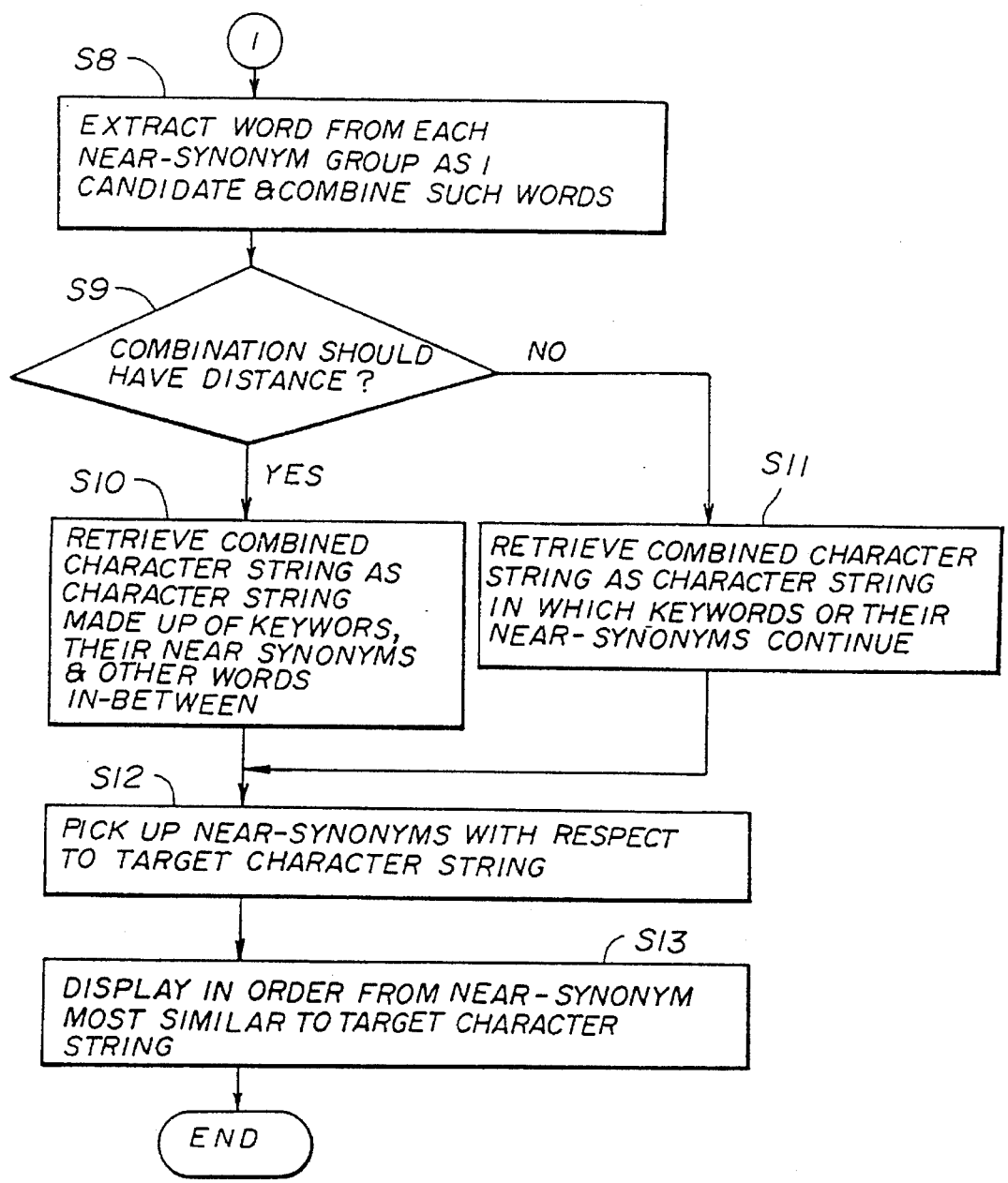
FIG. 8 is a flow chart for explaining the near-synonym generating process.

FIGS. 7 and 8 are flow charts for explaining the near-synonym generating process. The flow charts shown in FIGS. 7 and 8 as a whole correspond to the near-synonym generating process.

In FIG. 7, the operator specifies (inputs) the target character string 1 in a step S1. With respect to the specified target character string 1, the near-synonym generator 2 or the character string divider 3 decides whether or not the end symbol is inserted (exists) in a step S2. If the decision result in the step S2 is YES, the character string divider 3 divides the target character string 1 into words depending on the end symbols in a step S3. The words divided by this division are used as the keys when retrieving the near-synonyms, and will hereinafter be referred to as keywords.

On the other hand, if the decision result in the step S2 is NO, the character string divider 3 refers to the near-synonym file 8 and retrieves the keywords which form the target character string 1 and are defined in the near-synonym file 8 in a step S4. The keywords in the near-synonym file 8 are words such as "holiday" for which its near-synonym is defined. Then, the character string divider 3 divides the target character string 1 into words using the keywords which are retrieved from the near-synonym file 8 in a step S5.

After the dividing process ends, the retrieval processor 4 retrieves the near-synonym file 8 for each of the divided keywords and extracts the corresponding near-synonyms in a step S6. Then, the retrieval processor 4 forms one near-synonym group from the divided keyword and the corresponding near-synonyms which are extracted, and forms a plurality of such near-synonym groups in a step S7.

Next, one word belonging to the near-synonym group is selected, and the words elected from each of the near-synonym groups are combined in a step S8 shown in FIG. 8. As a result, the near-synonyms are generated.

In the above combining process, the retrieval processor 4 for example selects one word from each near-synonym group, and generates one near-synonym by arranging the selected words in order. Then, the replacing near-synonym processor 5 replaces the order of the near-synonyms and generates a plurality of replaced near-synonyms. Thereafter, the missing near-synonym processor 6 generates the missing near-synonym by omitting a part of the near-synonyms which are generated in this manner, for all of the near-synonyms which are generated. These processes are carried out for all combinations which can be formed using one selected word from each near-synonym group.

Next, the near-synonym generator 2 or the retrieval processor 4 decides whether or not the combination of the generated near-synonyms should have the distance in a step S9. The instruction related to whether or not the combination should have the distance is input in advance by the operator. The adding near-synonym processor 7 is started in response to this instruction input from the operator, and the added near-synonyms are generated. Accordingly, the function of generating the added near-synonyms can be started selectively.

If the combination is to have the distance and the decision result in the step S9 is YES, the adding near-synonym processor 7 in a step S10 inserts another word before or after or in-between each character string which is obtained by the combination in the step S8. As a result, the added near-synonyms are generated. The other word which is inserted cannot be specified, and is therefore represented by a predetermined symbol.

On the other hand, if the combination is not to have the distance and the decision result in the step S9 is NO, each character string which is obtained by the combination in the step S8 is regarded as it is as the near-synonym in a step S11.

The retrieval processor 4 stores the near-synonyms which are obtained by the above processes in a predetermined region as the generated result 9 in a step S12. In other words, if the step S10 is carried out, the generated result 9 is the near-synonyms obtained by the steps S8 and S10, and the generated result 9 is otherwise the near-synonyms obtained in the step S8.

Next, the near-synonym generator 2 or the retrieval processor 4 studies the generated result 9, and outputs the near-synonyms in a step S13 by arranging the near-synonyms in an order starting from the near-synonym which is most similar to the target character string 1.

Next, A description will be given of the near-synonym generating process and a specific example of the retrieval process using the near-synonyms which are generated by the near-synonym generating process.

FIGS. 9 through 11 show an example which specifies the contents of a newspaper article which is in a database by retrieving the newspaper article. Although this particular retrieval is made all in Japanese, English translations are shown in FIGS. 9 through 11 so that this particular retrieval can be understood.

In this example, the near-synonyms are generated by retrieving a near-synonym file 8A using a target character string 1A ("U.S. president candidate") shown in FIG. 9 (A). The generated near-synonyms are used to retrieve the newspaper article (not shown).

A retrieval result 14A' shown in FIG. 10 is obtained if the conventional retrieval method is employed. In this case, the retrieved article is unrelated to the target character string 1A, and it may be seen that the accuracy of the retrieval is poor.

The poor accuracy of the retrieval is caused by the extraction of "Japanese kanji character for 'rice' which is also used as an abbreviation for U.S.", "sasanishiki", "koshihikari", "U.S.A.", "United States" and "State of Texas" are extracted as near-synonyms of "America". "sasanishiki" and "koshihikari" are kinds of rice. In other words, the poor accuracy of the retrieval is due to the fact that the near-synonyms are not defined hierarchically.

On the other hand, in the near-synonym file 8A, the near-synonyms are defined hierarchically according to the present invention. In other words, "Japanese kanji character for 'rice' which is also used as an abbreviation for U.S." can be extracted from "America", but "America" cannot be extracted from Japanese kanji character for 'rice' which is also used as an abbreviation for U.S.". In addition, an extraction "America"→Japanese kanji character for 'rice' which is also used as an abbreviation for U.S."→ "sasanishiki" cannot be made, and only one hierarchy is considered valid. As a result, a highly accurate retrieval result 14A shown in FIG. 11 can be obtained in the present invention.

It is possible to detect different sounding synonyms having subtle differences in the nuance, by changing the manner with which the target character strings 1A are divided (or sectioned). A process of dividing the target character strings 1A in a plurality of ways may be carried out by the character string divider 3 based on the near-synonym file 8A.

Figure 13A:
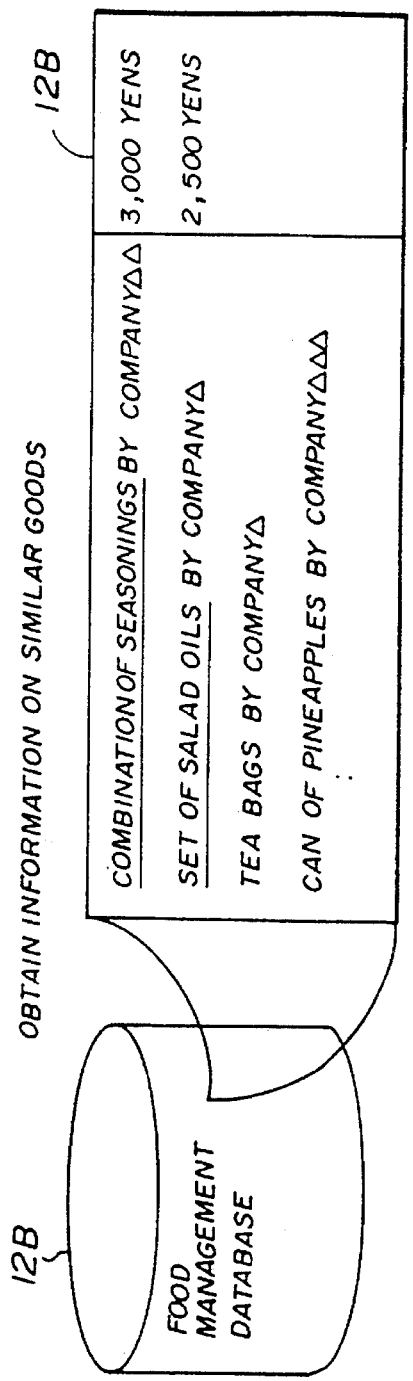
FIG. 13 in parts (A) and (B) is a diagram for explaining the application of the embodiment of FIG. 12.
Figure 13B:
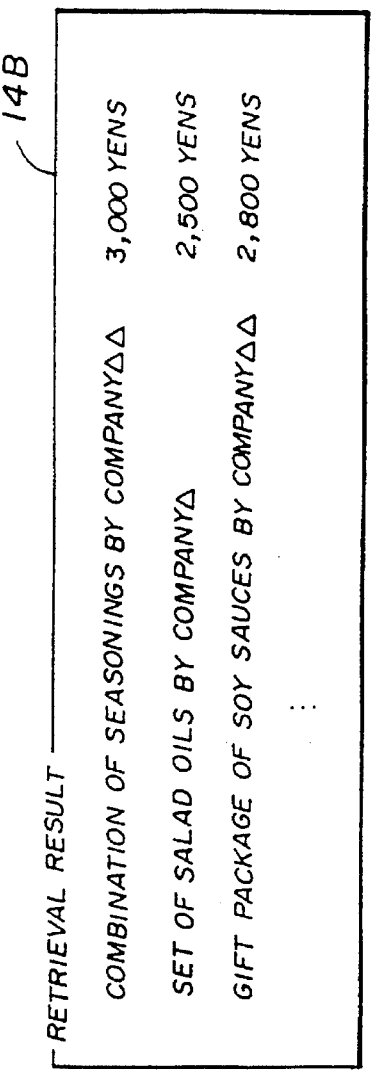

FIGS. 12 and 13 show an example where a food management database is taken as a retrieval file 12B and data are provided at the shop-front such as a department store in response to a fuzzy demand of a customer.

In this example, a target character string 1B ("a set of seasonings") shown in FIG. 12 (A) is used. This target character string 1B is in accordance with the customer's demand which is "I want to buy a set of seasonings under 3000 Yens".

By retrieving a near-synonym file 8B shown in FIG. 12 (B) using the target character string 1B, a generated result 9B shown in FIG. 12 (C) is obtained. Furthermore, by retrieving the retrieval file 12B shown in FIG. 13 (A) which is the food management database using the generated result 9B, a retrieval result 14B shown in FIG. 13 (B) is obtained. Hence, it is possible to collectively retrieve goods which are similar items but differ slightly by their names.

In this particular example, the company name of the producer is added to each of the goods. The company name is processed as the "other word" described above. The added near-synonyms including this other word are not generated as the generated result 9B, and the added near-synonyms are generated during the retrieval process stage as a pre-process.

If the goods are the subject of the retrieval, the near-synonym file 8 (8B) does not need to be defined by the code system of the Japanese kana and.or kanji characters, and the definition may be made using another code system such as the bar code system which is popularly used in transaction of goods. Since the retrieval file 12 (12B) often employs the bar code system, the retrieval can be easily made using the generated near-synonyms (conforming to the bar code system).

Figure 15:
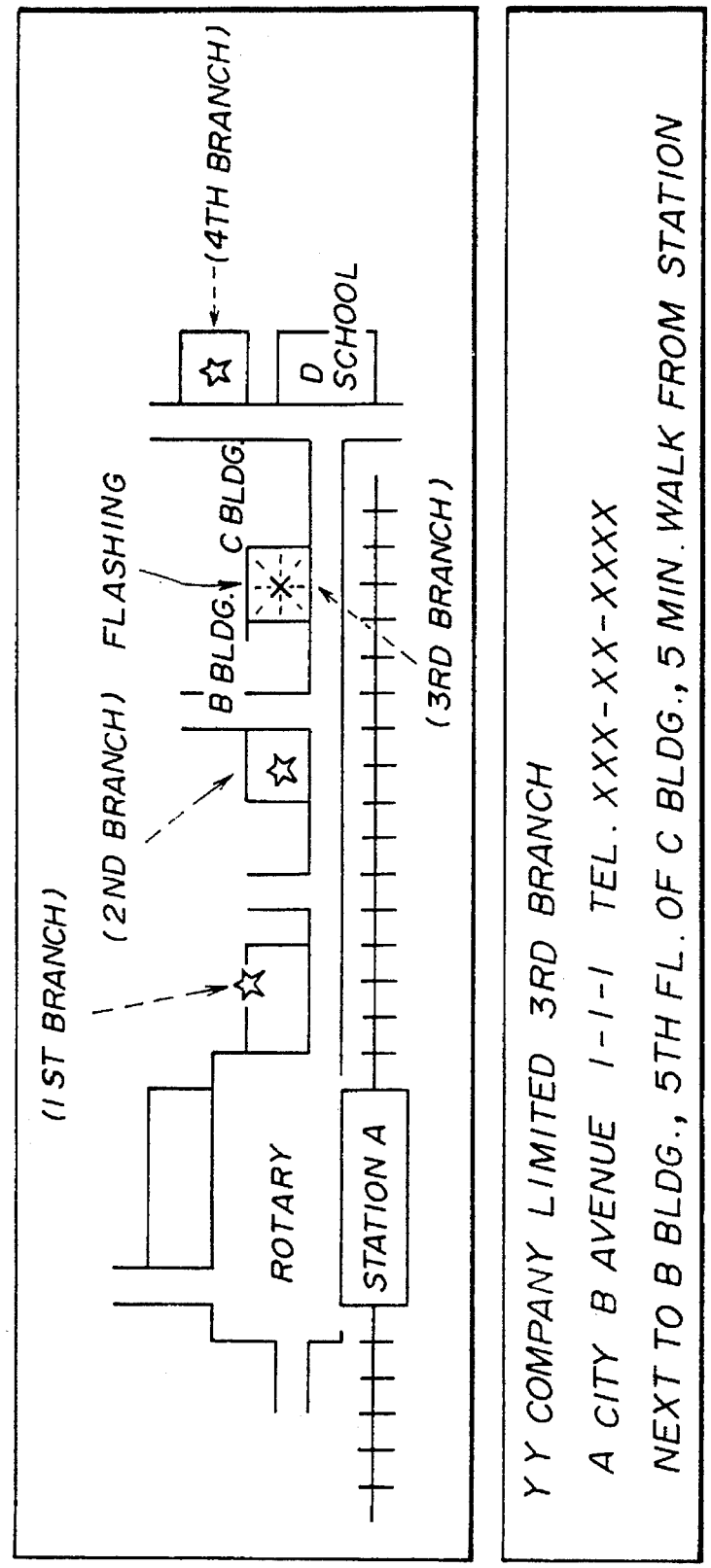
FIG. 15 is a diagram fop explaining the application of the embodiment of FIG. 14.

FIGS. 14 and 15 show an application of the embodiment to a destination guiding service set up at the station. For example, a person on a business trip may know his destination but not know exactly where it is. In such a case, the person inputs the name of the destination to a guiding board which is set up at stations or the like, so that the names or neighboring buildings can be retrieved and the exact position of the destination address can be indicated on the guiding board.

For example, let us assume that a person wishes to visit the Third Branch of a YY Company Limited, and this person only knows the abbreviated name "YY" of the company and "C Building" which is the same of the building in which this company is located. In this case, "YY/C Building" shown in FIG. 14 (A) is input as a target character string 1C. By retrieving a near-synonym file 8C shown in FIG. 14 (B) which is a destination information definition file using the target character string 1C, a generated result 9C shown in FIG. 14 (C) is obtained. The formal company name and the branch name are obtained from the generated result 9C.

Next, a retrieval file 12C shown in FIG. 14 (D) which is a building management database is retrieved using the generated result 9C, so as to obtain a retrieval result 14C shown in FIG. 15 which is a destination guiding map. As a result, it is possible to go to the correct destination even if the person is not familiar with the area (or region) and the formal name of the destination is incorrect.

In this example, the retrieval file 12C includes useful information such as the address, telephone number, building which can be used as a landmark on the map, means of traveling, and time. Such useful information is indicated on the retrieval result 14C. In addition, the map information (not shown) in the form of a database and the retrieval file 12C are linked, so as to indicate the destination guiding map. In other words, the retrieval result 14C is linked with other information and displayed.

FIG. 16 shows an application of the embodiment to a document retrieval in a library or the like.

In this example, "data communication" shown in FIG. 16 (A) is input as a target character string 1D. In this case, no end symbol "/" is inserted. Hence, a reference is made to a near-synonym file 8D shown in FIG. 16(B) which is a similar document definition file, and divides the target character string 1D into "data" and "communication". Then, various near-synonyms (not shown) are generated by retrieving the near-synonym file 8D. Furthermore, the generated near-synonyms re used to retrieve the document information (not shown) which is in the form of a database, and a retrieval result 14D shown in FIG. 16 (C) which is a document list is obtained.

In this example, the automatic division of the target character string 1D and the addition of other words are effective.

FIG. 17 shows an example where near-synonyms are generated when converting the rendering (reading) of the Japanese kanji character.

Presently, there exists a system for inputting the rendering (reading) of a Japanese word and converting it into Japanese kanji characters. Hence, virtually all Japanese kanji characters can be found as long as the rending (reading) is known. However, if a near-synonym of a word "a" is to be found, a reference must be made to a Japanese kanji dictionary or a reference book.

In this example, the rendering (reading) of Japanese words shown in FIG. 17 (A) is input as a target character string 1E. This rendering is pronounced "ju gyou in bangou" which means "employee number" in Japanese. A near-synonym file 8E shown in FIG. 17 (B) which is a near-synonym definition table is retrieved using the target character string 1E, and a generated result 9E shown in FIG. 17 (C) which is a Japanese kanji character conversion and near-synonym generating list is obtained. As a result, the near-synonyms can be found by simply carrying out the conversion to the Japanese kanji character.

In FIG. 17 (B), the English translation of the near-synonym file 8E is as follows.

"employee" in Japanese kana characters→

"employee" in Japanese kanji characters / "member" in Japanese kanji characters

"number" in Japanese kana characters→

"number" in Japanese kanji characters / "code" in Japanese kana characters / "No."

In addition, the English translation of the generated result 9E shown in FIG. 17 (C) is as follows.

"member number" in Japanese kanji characters

"employee code" in Japanese kana and kanji characters

"employee number" in Japanese kanji characters

FIGS. 18 and 19 show an application of the embodiment to a telephone number retrieval.

The telephone number retrieval is presently possible only if the destination (party name) and the location (area) are known. In addition, if a desired shop is to be retrieved, the so-called yellow pages telephone directory can be used. However, in the yellow pages, a certain index may lead to "look up under XXX", and the retrieval may not be possible in one try. Further, the retrieval takes time if a certain line of work is categorized into a plurality of kinds. Accordingly, the present invention enables retrieval of similar shops by simply inputting the index once.

Let us assumed that a company for repairing glass is to be found in "Atsugi-Shi" which is a city. In this case, "Atsugi-Shi glass repair" shown in FIG. 18 (A) is input as a target character string 1F. A near-synonym file 8F shown in FIG. 18 (B) which is a near-synonym definition file is retrieved using the target character string 1F, and the near-synonyms are generated. The target character string 1F is automatically divided in this case.

Next, the telephone number data in the form of a database is retrieved using the generated near-synonyms, so as to obtain a retrieved result 14F shown in FIG. 18 (C) which is a list of shop names. This retrieval result 14F satisfactorily matches a result shown in FIG. 19 which is obtained from the telephone 10 directory of "Atsugi-Shi" related to this field.

Further, the present invention is not limited to these embodiments, but various variations and modifications may be made without departing from the scope of the present invention.

What is claimed is:

1. A synonymous term generating method implemented by a computer for generating synonymous terms of a target character string by retrieving a synonymous term file based on the target character string, said synonymous term file defining synonymous terms for one or a plurality of words, said synonymous term generating method comprising the steps of:

(a) retrieving the synonymous term file using words which form the target character string as keys, and extracting synonymous terms which are defined for each of the words used as the keys as the synonymous terms for each of the words forming the target character string;

(b) forming a synonymous term group from each of the words forming the target character string and the synonymous terms so as to form a plurality of such synonymous term groups, and selecting at least one of the words and synonymous terms from each of the synonymous term groups; and (c) generating the synonymous terms of the target character string by combining at least one of words and synonymous terms obtained by said step (b) in an order which is different from the order of the words forming the target character string.

2. The synonymous term generating method as claimed in claim 1, which further comprises the step of:

(d) generating the synonymous terms of the target character string by using at least two selected words of synonymous terms obtained by said step (b).

3. The synonymous term generating method as claimed in claim 1, which further comprises the step of:

(d) generating the synonymous terms of the target character string by using at least two selected words or synonymous terms obtained by said step (b) and other words which are unrelated to the target character string based on a predetermined rule.

4. The synonymous term generating method as claimed in claim 3, wherein said predetermined rule is prescribed by a distance so that a number of words forming the target character string is n, the distance between two mutually adjacent words is "1", a value n which is identical to the number of words forming the target character string is set as a maximum distance, and the synonymous terms of the target character string are generated at a distance less than or equal to said maximum distance.

5. The synonymous term generating method as claimed in claim 1, wherein the synonymous term file which is used for the retrieval in said step (a) also defines different sounding synonyms of the words as the synonymous terms of the words and defines the relationship of the words and the synonymous terms in a hierarchial relationship, said different sounding synonyms being synonyms which sound differently.

6. The synonymous term generating method as claimed in claim 5, wherein said step (a) extracts the synonymous terms including the different sounding synonyms and are defined for each of the words used as the keys as the synonymous terms for each of the words forming the target character string.

7. The synonymous term generating method as claimed in claim 1, which further comprises the step of:

(d) dividing the target character string into the words forming the target character string if the target character string is not yet divided into such words by using the words, the synonymous terms of which are defined in the synonymous term file, prior to the retrieval by said step (a).

8. The synonymous term generating method as claimed in claim 1, which further comprises the steps of:

(d) generating the synonymous terms of the target character string by using at least two selected words or synonymous terms obtained by said step (b); and (e) generating the synonymous terms of the target character string by using at least two selected words or synonymous terms obtained by said step (b) and other words which are unrelated to the target character string based on a predetermined rule.

9. The synonymous term generating method as claimed in claim 8, wherein said predetermined rule is prescribed by a distance so that a number of words forming the target character string is n, the distance between two mutually adjacent words is "1", a value n which is identical to the number of words forming the target character string is set as a maximum distance, and the synonymous terms of the target character string are generated at a distance less than or equal to said maximum distance.

10. The synonymous term generating method as claimed in claim 8, wherein the synonymous term file which is used for the retrieval in said step (a) also defines different sounding synonyms of the words as the synonymous terms of the words and defines the relationship of the words and the synonymous terms in a hierarchial relationship, said different sounding synonyms being synonyms which sound differently.

11. The synonymous term generating method as claimed in claim 10, wherein said step (a) extracts the synonymous terms including the different sounding synonyms and are defined for each of the words used as the keys as the synonymous terms for each of the words forming the target character string.

12. The synonymous term generating method as claimed in claim 8, which further comprises the step of:

(f) dividing the target character string into the words forming the target character string if the target character string is not yet divided into such words by using the words, the synonymous terms of which are defined in the synonymous term file, prior to the retrieval by said step (a).

* * * * *